(12) United States Patent
Goldman

(10) Patent No.: US 6,783,582 B2
(45) Date of Patent: Aug. 31, 2004

(54) SYSTEM FOR TREATING PETROLEUM AND PETROCHEMICAL SLOP OIL AND SLUDGE WASTES

(75) Inventor: Gordon K. Goldman, Metairie, LA (US)

(73) Assignee: Nuritchem, LLC (Louisiana), New Orleans, LA (US)

( * ) Notice: Subject to any disclaimer, the term of this patent is extended or adjusted under 35 U.S.C. 154(b) by 125 days.

(21) Appl. No.: 09/994,390

(22) Filed: Nov. 26, 2001

(65) Prior Publication Data

US 2002/0066391 A1 Jun. 6, 2002

Related U.S. Application Data

(63) Continuation-in-part of application No. 09/317,669, filed on May 24, 1999, now Pat. No. 6,322,621.

(51) Int. Cl.⁷ .......................... C08L 91/06; C08L 91/08; C09D 191/06; C09D 191/08
(52) U.S. Cl. ....................... 106/270; 106/268; 106/271; 106/272; 524/78
(58) Field of Search ................................. 106/268, 270, 106/271, 272; 524/78; 120/270, 271, 276

(56) References Cited

U.S. PATENT DOCUMENTS

| | | | |
|---|---|---|---|
| 4,477,337 A | 10/1984 | Ronden et al. | |
| 4,551,239 A | 11/1985 | Merchant et al. | |
| 5,525,201 A | 6/1996 | Diaz-arauzo et al. | |
| 6,000,412 A | 12/1999 | Chan et al. | |
| 6,322,621 B1 * | 11/2001 | Goldman | 106/270 |

FOREIGN PATENT DOCUMENTS

JP 409296162 11/1997

OTHER PUBLICATIONS

Goldman, Gordon K. et al, entitled "Cleaning Up the Slop: Part II" in Hydrocarbon Engineering (Dec. 1999).
Goldman, Gordon K. et al, entitled "Cleaning Up the Slop" in Hydrocarbon Engineering (Jul./Aug. 1999).

* cited by examiner

Primary Examiner—David Brunsman
(74) Attorney, Agent, or Firm—Pugh/Associates. Patent & TM Attorneys; C. Emmett Pugh

(57) ABSTRACT

An initial chemical composition comprising selected surfactants, dispersants, and degreasers that liquefy, disperse, demulsify, degrease, inhibit corrosion and scale formation, and lower the pour point of a petroleum, coal, Fischer-Tropsch synthesized, or naturally occurring paraffin-based wax and asphaltene. Such a product is capable of converting crystalline wax (paraffin) in, for example, slop oil into an amorphous form of wax at room temperature, allowing the wax to be dissolved in, for example, crude oil without the need for heating, and maintaining it in solution at room temperature, substantially reducing, indeed in some applications, preventing, for example, wax build-up in pipelines, processing and transportation equipment, etc., and the recovery of the hydrocarbons in the slop oil. In a second aspect of the invention, the pre-blend addition of a hydrotrope-demulsifier, a chelating agent and a wax plasticizer can result in a BS&W of zero for the recovered hydrocarbon blend.

5 Claims, No Drawings

SYSTEM FOR TREATING PETROLEUM AND PETROCHEMICAL SLOP OIL AND SLUDGE WASTES

REFERENCE TO RELATED APPLICATION/PATENT

This application is a continuation-in-part of Ser. No. 09/317,669 filed May 24, 1999, which is being issued as U.S. Pat. No. 6,322,621 on Nov. 27, 2001, the disclosure of which is incorporated herein by reference.

BACKGROUND

1. Field of Invention

The present invention relates generally to converting crystalline wax, as, for example, exists in slop oil, to an amorphous form of wax, causing it to be dissolvable in, for example, crude oil at, for example, ambient temperature and maintained in a dissolved state for a prolonged period of time at ambient temperature, and more particularly, in its preferred, exemplary embodiment, to the use preferably of a chemical composition of surfactants, polymeric dispersants and corrosion & scale formation inhibitors that can, for example, recover waste hydrocarbon products (paraffin waxes, asphaltenes, and coke) from both naturally-occurring and synthetic sources, and more particularly to recover these waste hydrocarbon products for use as energy sources and to reduce environmental pollution. A number of other applications is also disclosed and claimed.

Also, since the advent of new environmental laws for the disposal of hydrocarbon based sludge, the petrochemical industries have implemented the use of various types of cleanup systems. The most commonly used methods have been mechanical systems such as centrifuges, decanters, tricanters and various types and designs of liquid-solid separators. Most mechanical separation systems are limited by temperature and volume constraints.

Using mechanical systems alone, solid-liquid separations are never complete. In order to obtain a complete separation with a minimum of residual emulsion rag (BS&W) remaining, chemicals are added to enhance the efficiency of the separation. Since refinery and petrochemical sludge oil residues are listed by the E.P.A. as toxic and hazardous wastes, they must be disposed of at a regulated special waste dump. Because of the limited amount of sites available for disposing such toxic and hazardous wastes, the disposal costs are extremely high.

In the year 2000 the average worldwide cost for disposal of these wastes ranged from 350 to 500 dollars/metric ton (52 to 75 dollars per barrel) of sludge oil waste. Oilfield production slop oil and sludge wastes are also a problem and are normally treated with the same methods used by refineries.

2. Prior Art

For general background, "prior art" information pertinent to the invention, reference is had to:

The Chemistry and Technology of Waxes by Albin H. Warth, published by Reinhold Publishing Corp. (New York, 1947), p. 239 et al;

Petroleum Refinery Engineering by W. L. Nelson, published by McGraw-Hill Book Co. (New York, 4th Ed., 1958), particularly Chapter 12 "De Waxing" (pp. 374–75 et seq.);

Physical Chemistry by Walter J. Moore, published by Prentice-Hall, Inc. (New York, 1955), particularly Chapter 16 "Surface Chemistry" (p. 498 et seq.); and chemical and process technology encyclopedia edited by Douglas M. Considine, published by McGraw-Hill Co. (New York, 1974), particularly its sub-section on "Waxes" (p. 1167 et seq.).

Also some patents cited in the parent application hereof include the following—

| Patent No. | Inventor(s) | Date |
| --- | --- | --- |
| 409296162 | [Abstract Only] | November 1997 |
| 6,000,412 | Chan et al | December 1999 |
| 5,525,201 | Diaz-arauzo et al | June 1996 |
| 4,551,239 | Merchant et al | November 1985 |
| 4,477,337 | Rouden et al | October 1984 |

Also, the publications entitled "Cleaning Up the Slop: Part II" in Hydrocarbon Engineering (December 1999) and the preceding article "Cleaning Up the Slop" (July/August 1999) are noted, but are not considered "prior art" in view of the priority date of the parent application (U.S. Pat. No. 6,322,621) for claims which incorporate innovative aspects of the parent's technology, which are patentable either alone or in combination with the new technology of the further, second aspect of the present invention.

Waxy materials present in crude oils and in the high boiling fractions are considered to be crystalline throughout but under certain conditions may behave like a colloid. Certain wax solutions of refined products such as petrolatum, when agitated or mixed for long periods near or at the crystallizing temperature, will form a completely transparent jelly. But the same solution, when chilled rapidly with moderate agitation will precipitate a wax that can be centrifuged.

It was observed many years ago in the sweating of solid paraffins at the petroleum refinery that three crystalline forms (manifestations) of hydrocarbons are involved. These are known as "plate", "malcrystal", and "needle" [note, for example, The Chemistry and Technology of Waxes by Albin H. Warth, published by Reinhold publishing Corp. (New York, 1947), p. 239]. It was recognized that the relative proportion of these types of crystals not only has a relationship to the source of the crude but also to the process of handling the wax.

The members of each series crystallize similarly as either plates, malcrystals, or needles. If one type is present (plate, mal, or needle), the crystal form remains the same regardless of such factors as the amount and kind of solvent.

When crude oil is pumped from the ground and transported through pipelines, transported by ocean tankers, or stored in storage tanks on land or offshore, a large amount of heavy material separates and comes out of solution. The main component of this residue is high molecular weight paraffin waxes. In some cases the wax represents as much as ninety (90%) percent of the deposited residues.

The amounts of wax present in crude oil are to a large extent an indicator of its origin, whether the crude originated in Venezuela, Mexico, or Malaysia.

This mixture of wax, oil, sand, and water is referred to as "slop oil," or "slop," in the petroleum industry. The percentage of slop oil varies according to the type of crude and the conditions under which it has been transported. Usually the amount of slop oil ranges from a low of a half percent (0.5%) to a high of ten percent (10%); normally, it is in the range of two percent (2% to 5%) to five percent.

For the last century and until today the only way to keep slop oil from separating from crude oil is to heat the slop oil while it is being transferred into mixing tanks with crude oil.

The cost of keeping slop oil mixed with crude oil is a function of many variables such as temperature, solvent diluents, and residence time of the crude in a tank or pipeline.

The petroleum industry is plagued with the problem of having to deliver crude oil to refineries in a timely and economic manner. If a pipeline becomes plugged up or clogged because of paraffin wax precipitating out during the pumping operation, a crisis can arise. Numerous pipelines worldwide are clogged daily or monthly due to wax precipitating out of the crude oil. Daily, 50,000,000 barrels of crude oil are pumped from the ground worldwide (as of May, 1999). If 5% of the heavy residues come out of the crude oil being transported, whether by pipeline or tanker, the amount of slop oil or crude residue is 2,500,000 barrels per day. This amounts to 912,000,000 barrels per year. If 70% of this slop oil is useable crude which can be processed to refine production, then the amount of recoverable hydrocarbon equals over 640,000,000 barrels per year. At a cost of $10.00/barrel of crude oil this amounts to the recovery of $6.4 billion per year of useable hydrocarbon as either energy or petrochemical feedstock.

Another important factor in the transportation of crude oil is the corrosion of pipelines, storage tanks, and marine tankers. One of the main sites of corrosion in pipelines and storage tanks is at the point of buildup of the paraffin wax. At this site corrosion-causing chemicals become embedded in the wax and migrate to the metal surfaces. Pipelines with intrinsically large wax buildup or settling have many more corrosion problems than pipelines where the oil moves swiftly without deposition occurring. This results in increased maintenance cost and in some cases pipelines have to be shut down and crude must be rerouted to new lines as a result of both the clogged lines and corrosion. One of the main maintenance tools used to unclog crude oil pipelines is pigging the line. In this process a small device shaped like a pig with a series of scrapers on its sides is shot through the line to remove all the wax. This wax is then collected at traps located along the line and shipped to pipeline pumping stations for storage.

In storage tanks the problems associated with wax settling out are tremendous and present an extremely challenging task to refiners and terminal operators.

When crude oil remains idle and cold in a storage tank, a heavy residue forms that, over time, accumulates at the bottom of the tank and reduces useable tank volume. This residue, known as slop oil (or, slop), consists of heavy paraffinic waxes and asphaltenes which solidify in crystalline form. Slop oil is extremely difficult to remove from tanks and presents a very costly disposal problem for the refinery and terminal operator.

Traditional tank cleaning methods use a combination of heat (e.g., 60 to 75 degrees C. or greater) and mechanical agitation to force the slop oil back into solution with crude oil, so the mixture can be pumped out of the tank. In order to keep the waxes and asphaltenes in solution with the crude oil, the mixture must be kept at, for example, 75 degrees C. or greater and, in most cases, continuously circulated. The tremendous amounts of energy required to heat and circulate large volumes of dense crude oil to these elevated temperatures over long periods of time increase handling costs dramatically.

After pumping out the slop oil containing paraffin waxes and asphaltenes, the slop oil mixture must be kept hot or the wax will separate from solution, and the problems associated with slop oil will recur.

This need to use heat results in great energy cost and losses.

Also, as noted above, since the advent of new environmental laws for the disposal of hydrocarbon based sludge, the petrochemical industries have implemented the use of various types of cleanup systems. The most commonly used methods have been mechanical systems such as centrifuges, decanters, tricanters and various types and designs of liquid-solid separators. Most mechanical separation systems are limited by temperature and volume constraints.

Using mechanical systems alone, solid-liquid separations are never complete. In order to obtain a complete separation with a minimum of residual emulsion rag (BS&W) remaining, chemicals are added to enhance the efficiency of the separation. Since refinery and petrochemical sludge oil residues are listed by the E.P.A. as toxic and hazardous wastes, they must be disposed of at a regulated special waste dump. Because of the limited amount of sites available for disposing such toxic and hazardous wastes, the disposal costs are extremely high.

In the year 2000 the average worldwide cost for disposal of these wastes ranged from 350 to 500 dollars/metric ton (52 to 75 dollars per barrel) of sludge oil waste. Oilfield production slop oil and sludge wastes are also a problem and are normally treated with the same methods used by refineries.

OBJECTS AND ADVANTAGES

The preferred, exemplary chemical compound mixture described herein will perform, inter alia, the following functions:

1. Converts the wax in, for example, the slop oil from a crystalline to an amorphous material;
2. Disperses the amorphous material into a diluent solvent;
3. Acts as a demulsifier which separates any water present in the slop oil;
4. Acts as a degreaser and works at a very low activity, e.g., 0.025%; and
5. Acts as a pour point depressant.

Since it acts as a wax liquefier and converts the wax to a less crystalline and more amorphous form, the slop oil waxes are readily dispersible into the crude oil medium. Thus a colloid is formed consisting of heavy paraffin wax and asphaltene compounds dispersed in crude oil. Since the preferred, exemplary composition of matter described herein also acts as a demulsifier, all water present in the slop oil mixture separates out, as well as the sand or grit present. The heavy paraffin wax and asphaltenes are dispersed as hydrocarbon into the crude oil and can be, for example, transported to the refinery for processing or to a marine tanker or other transport for shipment, for example, at ambient temperature.

The use of the preferred, exemplary composition of matter described herein, when, for example, injected into crude oil pipelines at, for example, the production source, is capable of keeping the heavy wax and asphaltenes dispersed in the crude oil. Having the wax and asphaltenes dispersed one hundred (100%) percent into the crude oil will accomplish at least the following:

1. Lower maintenance costs by reducing the need to use costly pigging operations on pipelines, which requires at least a partial shut-down of the pipeline;
2. Lower maintenance costs by reducing the problems associated with corrosion in pipelines; with both items "1" and "2a" reducing the number of downtime stoppages in the pipeline; and
3. Increase the throughput and flow rate of crude oil through pipelines.

The main goal and objective of a crude oil pipeline company is, for example, to deliver to their customers a fixed amount of crude on an agreed-to, set schedule; every day that schedule is not met because of technical problems, the company loses money.

If the preferred, exemplary composition of matter described herein is mixed with crude oil loaded on, for example, marine tankers, the problems associated with wax deposits will be at least greatly inhibited, if not prevented from occurring, namely, slop oil residues will be greatly reduced and indeed prevented from forming. In, for example, oceangoing marine tankers the problems are twofold. At the end of many journeys the tankers have to go into drydock for maintenance due to corrosion caused by slop oil settling out and coating the walls of the tanks.

The benefits of the preferred, exemplary chemical composition described herein can be realized in, for example, the following ways:

1. Recovery of at least 640,000,000 barrels per year of hydrocarbons (based on a daily production of 50,000,000 barrels), which results in a yearly recovery value of approximately $6.4 billion at a world crude oil price of $10.00/barrel. At a world crude oil price of $20.00/barrel the yearly recovery value would be $12.8 billion;
2. The projected cost for use of the composition of matter described herein as a wax and asphaltene dispersant, liquefying agent, and demulsifier would range in price at 1999 costs from a low of about $0.05/barrel to a high of about $0.42/barrel, depending on the injection rate; and
3. The overall maintenance costs associated with pipeline transport, marine tanker transport, and storage tank cleaning could be as much as $0.10/barrel of crude oil produced or $2.0 billion per year.

In addition to the exemplary application of use with crude oil, there are many other applications of the principles and teachings of the present invention, as detailed and exemplified below, all with great utilitarian benefits.

Thus, some of the objects include the following.

It is thus an object of the invention to convert crystalline wax to an amorphous form by, for example, reducing its surface tension.

It is a further an object of the invention to convert crystalline wax to an amorphous form suitable for being dissolved in a desired or available diluent, for example, in crude oil or other hydrocarbon, when dealing with, for example, slop oil for, for example, recovery of the hydrocarbons in the slop oil and for enhanced transportation and pipeline movement of crude oil.

It is a still further object of the invention to provide a particularly efficacious dispersant for wax or paraffin, while also preferably providing corrosion and scale formation inhibition, demulsifying and degreasing, with preferably a homogeneous mixture.

It is a still further an object of the invention to provide enhanced cleaning of objects having, for example, a build-up of wax-containing substance(s).

It is a still further an object of the invention to provide cloud point lowering of, for example, lube oil and the like, i.e., dehazing.

It is a still further an object of the invention to provide pour point lowering of, for example, lube oil and the like.

It is a still further an object of the invention to provide a product or composition of matter and associated method for converting crystalline-wax-containing substances to an amorphous form in one or more of the applications detailed below.

For a further understanding of the nature and objects of the present invention, reference should be had to the foregoing and the following general discussion and detailed description.

GENERAL DISCUSSION OF INVENTION

First Aspect of Invention

The invention described herein in a very important, first aspect relates to the use of a composition of matter or chemical composition and an associated mixture that acts as, for example, a paraffin and asphaltene liquefying and dispersing agent and as a dispersing agent for coke and coal fines. The dispersing medium can be, for example, a petroleum-based product (such as crude oil or any refined petroleum product), a Fischer-Tropsch-based product (such as liquid hydrocarbon products derived from natural gas and byproducts of natural gas), coal, town gas, waste gases derived from animal and vegetable wastes, oils and organic solvents derived from agricultural sources (such as, for example, edible oils, furfural, alcohols, and other organic liquids) and water.

The source of the paraffin being liquefied and dispersed can be from, for example, petroleum, petrochemical, Fischer-Tropsch synthesis (including natural gas, natural gas liquids, coal, coal byproducts—peat, etc.), agricultural sources (carnauba-palm leaves, etc.), and animal sources (e.g., beeswax). The source of the asphaltene being liquefied and dispersed can be, for example, from petroleum, petrochemical, Fischer-Tropsch synthesis, coal, and shale.

In accordance with this aspect of the invention a method for liquefying and dispersing paraffin waxes and asphaltene containing, for example, petroleum products, can be dispersed into, for example, crude oil, refined petroleum products (such as diesel, fuel oil, etc.) and other solvents such as water at room temperature. The dispersions remain stable at ambient temperatures over a long period of time. The preferred process of carrying out this invention includes, for example, the simple mixing of waste paraffin waxes and asphaltenes in the presence of crude oil or any refined petroleum product mixed with the product described herein at a concentration ranging from about 50 to about 100,000 ppm, at either, for example, ambient temperature or at an increased temperature, e.g., the melt temperature of the paraffin wax, if so desired, with the optimum concentration ranging from about 250 to 1,500 ppm.

The dispersion of the paraffin wax and asphaltenes tend to disperse more easily at higher temperatures using lower concentrations of chemical dispersant. The ultimate result of mixing the wax and asphaltene with the diluent is the same whether it is mixed at ambient temperatures (e.g., 21 degrees C.) or at higher temperatures (e.g., about 60 to about 120 degrees C. or higher, if so desired), namely that the wax and asphaltene are dispersed in the diluent, whether, for example, crude oil or other refined products, and stays in solution for at least six (6) months, based on current tests, which are still on-going, if not longer.

Additional advantages of this preferred, exemplary application of the invention, as well as other applications, will become apparent from the description which follows.

In other diluents, such as water, it was found that the wax in grease that has oxidized for over, for example, three (3) years, can be instantly liquefied and dispersed in water. The dispersion of the grease in water was passed through a water filtering system, with the end result being water of a quality acceptable for reuse.

The principles and teachings of the present invention have broad applicability, and a number of other, exemplary applications are listed below.

Second Aspect of Invention

Also, in a second aspect of the invention, a single step method is presented whereby petroleum slop oil and sludge wastes from both oil production sites and refineries as well as petrochemical plants are treated with a chemical composition that causes the sludge wastes to separate into three distinct phases, solids (lower layer), water (middle layer) and recovered oil (upper layer).

In the process presented as part of the second aspect of the invention, the sludge oil emulsion wastes also are treated with an organic acid demulsifier described more fully below (in a range of about 0.015 to about 7.5% by volume of waste treated) and a slop oil dispersant in the range of about 0.005 to about 2.5% by volume of waste treated) capable of liquefying any paraffins or asphaltenes present. The slop oil dispersant described in U.S. Pat. No. 6,322,621 modified as per the second aspect of the invention preferably is capable of liquefying any heavy hydrocarbons in the slop oil or sludge and dispersing the hydrocarbon present into diesel, light crude oil, heavy crude, asphaltic crude and/or crude oil tank bottoms.

All the solids present in the slop oil sludge emulsion are separated and dispersed into the water layer. Depending upon the amount of solids present the separation and settling times vary from 10 minutes to two days. Solid compositions containing rust or iron oxides, silica (sand) and/or inorganic salts such as sulfates, carbonates and mixed salts of alkaline earth metals and complex metal mixtures can be dispersed and will settle out of solution completely. The water present separates as a middle layer. Water clarity has been observed to be acceptable.

The process works in the following manner—to a reactor containing slop oil (sludge oil waste) is added, a slop oil dispersant described in Applicant's U.S. Pat. 6,322,621, as well as herein, modified, in accordance with a second aspect of the invention, preferably in the range of 0.005 to 2.5% by value of waste treated). The concentration of slop oil dispersant depends upon the type and quality of the slop oil sludge waste to be treated. To this mixture is added a water solution containing an acid demulsifier (as described more fully below). The amount of water added preferably should be not less than three times the amount of slop oil or sludge waste present.

The amount of acid demulsifier is 0.015 to 7.5%. This mixture is then heated to 90 to 100° C. with stirring for at least 45 to 90 minutes or at least until a three-phase separation occurs. After a three-phase separation occurs, the temperature is lowered to 85° C. and a calculated amount of hydrocarbon diluent is added to the mixture. The mixture of slop oil, water, hydrocarbon diluent and chemicals ("505-SD-M"+"A-1000," both more fully described and/or defined below) are heated and stirred for an additional three hours at 80 to 90° C. The length of time needed for stirring will depend upon the type of sludge oil being treated and the hydrocarbon diluent used.

At the end of the prescribed time for heating at 80 to 90° C., the heat is removed, stirring is continued until the reactor reaches ambient temperature. When the reactor reaches ambient temperature, stirring is discontinued. The contents in the reactor will separate into two main layers. The top layer will contain the recovered hydrocarbon from the slop oil being treated plus the added hydrocarbon diluent. The lower layer will contain water present in the slop oil being treated plus the added water and the solids in the slop oil. On standing the dispersed solids will separate resulting in a three-phase separation, top layer of oil, middle layer of water and a lower layer of solids.

In this system the demulsifier breaks the slop oil emulsion of oil, water and solids. The slop oil dispersant disperses the solids present into the water and the hydrocarbon separating from the emulsion is simultaneously dispersed into the hydrocarbon diluent. These three physical chemical processes are carried out simultaneously in the presence of hot water and steam. Any paraffins or asphaltenes present in the slop oil being treated are transformed to an amorphous state so they can be dispersed into the hydrocarbon diluent present.

This synergistic process is aided by the presence of hot water and steam, which act as a heat transfer medium. After the final separation occurs the oil layer is pumped out to a storage tank. The recovered water can be transferred to another reactor for re-use in treating additional batches of slop oil sludge or back to a water treatment plant, saving on the use of A-1000 (described more fully below). The solids are carted away for disposal. It has been found that the recovered water from the process yields a better separation when it is reused for future treatments.

The source of the water used in the process can be refining or process plant water, production wastewater, brine or any other type of available water. The best results have been obtained using the water recovered from the primary slop oil treatment process.

Hydrocarbon diluents that have been used are diesel, Light Cycle Oil (L.C.O.), Vacuum Gas Oil (V.G.O.), Middle Distillate, Kerosene, crude oil (light or heavy), crude oil tank bottoms, asphalt crude and fuel oil. When refinery sludges are treated the best results are obtained using Light Cycle Oil, Middle Distillate, Vacuum Gas Oil, fuel oil and crude oil. This is especially the case with refinery sludges containing high concentrations of paraffins and asphaltenes. When treating oil production sludges the best hydrocarbon diluents are the crude oil from which the sludge originates. For example, asphalt waste sludges from an asphalt crude production site are best treated with the asphalt crude from which the sludge originated. The same would apply to heavy paraffin wax sludges. In practice we have found that in the case of heavy waxy sludges the best diluent for dispersing the recovered waxy product is the crude oil from which it originated.

DETAILED DESCRIPTION

Exemplary Initial Chemical Composition (1$^{st}$ Aspect)

The preferred, exemplary composition of matter or chemical composition or exemplary, currently preferred, wax liquefier and dispersant of a first aspect of the invention is a homogeneous mixture (preferably pure solution, one phase) of about 25% to about 99.5% by weight of surface active agent, about 15% to about 35% by weight butyl cellosolve, about 5% to about 15% by weight of pine oil and a specially mixed catalyst solution made of saturated higher fatty acids, an alkly phenol and an oil-water soluble copolymer of partially sulfonated, maleic anhydride and polystyrene with a molecular weight ranging from about 2,000 to about 2,000,000. The catalyst mixture normally is present in a range of about 0.5% to 5%, with all percentages being "by weight" percentages.

One particularly preferred, exemplary composition is about 48% surface active agent in the form of a nonionic polyethoxylated compound, e.g., one derived from polyethylene oxide, which has a H.L.B. number of 11.0.

As is known in the surfactant art, an H.L.B. number represents a fundamental property of a nonionic surfactant that correlates with both physical properties and surface active effects. The H.L.B. number is a measure of the hydrophilic and lipophilic (hydrophobic) characteristics of the surfactant molecule. In a series of surfactants prepared by the ethoxylation of an alcohol or amine, for example, the ratio of hydrophilic to lipophilic portions increases with the increasing degree of ethoxylation. This corresponds to an increase in hydrophilic character—or water solubility—of the molecule. The H.L.B. number of the surfactant determines the type of emulsion produced as well as the stability of the emulsion. A water-in-oil (W/O) type of emulsion requires emulsifiers of low H.L.B. number, e.g., about four (4) [100% water insoluble-non-dispersible in water)], while an oil-in-water (O/W) type requires emulsifiers with higher H.L.B. numbers, e.g., nine to sixteen (9–16). Surfactants with H.L.B. numbers near thirteen (13) are detergents, and those of fifteen to sixteen (15–16) are stabilizers. The surface active agents in the currently preferred, exemplary product preferably have a H.L.B. number ranging from about ten to about eleven and a half (10–11.5) and are considered to be good re-wetting agents (low contact angle) and are good emulsifying and dispersing agents for oils and solids.

Another factor to be considered is the addition of a surface tension depressant. In order to enhance the effectiveness of the surface active agent, for example, a fluorocarbon alcohol is added to lower the surface tension of the composition of matter. Normally the amount added is, for example, 0.1%. Therefore, the surface active agent consists of a nonionic surfactant that is made up of, for example, about 99.9% of a preferably commercially available, nonionic polyethoxylate surfactant and, for example, about 0.1% of a surface tension depressant in the form of, for example, a flouronated hydrocarbon alcohol. The range of surface tension for the final composition of matter ranges from about 10 to about 48 dynes/cm and more preferably from about 15 to about 32 dynes per cm.

The by-weight percent of the nonionic surface active agent is preferably about 48%, with about 32% butyl cellosolve and about 17% pine oil (with both of these latter components acting as a degreaser), about 3% of a mixture containing about 70% higher fatty acids, about 29% a copolymer of partially sulfonated, maelic anhydride and polystyrene, and about 1% of catechol (serving as a corrosion inhibitor).

The foregoing, preferred chemical mixture is referenced herein as "505-SD."

Other surface active agents, which may be used in place of or in combination with the exemplary polyethyleneoxide-based, nonionic surfactant, are outlined below.

-Types of Nonionic Surfactants-

| | H.L.B.# |
|---|---|
| 1. Ethonylated Alcohols | |
| tridecyl alcohol ethoxylate (6 EO) (where EO is ethlyene oxide) | 11.4 |
| tridecyl alcohol ethoxylate (9 EO) | 13.3 |
| tridecyl alcohol ethoxylate (12 EO) | 14.5 |
| tridecyl alcohol ethoxylate (15 EO) | 15.3 |
| Witco Chemicals' tridecyl alcohol ethoxylate | 12.4 |
| Stepan Chemicals' tridecyl alcohol ethoxylate | 12.4 |
| alcohol ethoxylate (3 EO) | 8.0 |
| alcohol ethoxylate (6 EO) | 11.8 |
| alcohol ethoxylate (8 EO) | 13.2 |
| alcohol ethoxylate (10 EO) | 14.1 |
| $C_8$–$C_{10}$ alcohol ethoxylate (6 moles) | 12.5 |
| $C_8$–$C_{10}$ alcohol ethoxylate (8 moles) | 13.6 |
| 2. Reactions of Cocoacid + Polyethylene Glycol (PEG) | |
| PEG30 - glyceryl cocoate | 15.9 |
| PEG80 - glyceryl cocoate | 18.0 |
| PEG30 mixture - glyceryl cocoate | 15.9 |
| PEG20 - glyceryl tallowate | 13.0 |
| PEG80 - glyceryl tallowate | 18.0 |
| PEG200 - glyceryl tallowate | 19.0 |
| PEG2 cocamine | 6.2 |
| PEG5 cocamine | 11.0 |
| PEG10 cocamine | 13.8 |
| PEG15 cocamine | 15.4 |
| PEG15 cocamine mixture | 15.4 |

It is noted that, as the amount of ethoxylation increases, the H.L.B. # increases, and the cationic character changes to more nonionic.

| | |
|---|---|
| PEG2 tallow amine | 5.1 |
| PEG2 tallow amine mixture | 5.1 |
| PEG5 tallow amine | 9.2 |
| PEG10 tallow amine | 12.6 |
| PEG15 tallow amine | 14.4 |
| PEG15 tallow amine mixture | 14.4 |
| PEG20 tallow amine | 15.4 |
| 3. Other Commercially Available, Nonionic Surfactants | |
| Nonylphenol (5 EO) | 6.8 |
| Nonylphenol (10 EO) | 11.0 |
| Nonylphenol (12 EO) | 12.2 |
| Nonylphenol (15 EO) | 13.5 |
| Nonylphenol (18 EO) | 19.5 |

3. Other Currently Non-Commercially Available, Nonionic Surfactants
   a. nonionic surfactant formed from α-diol condensation products;
   b. polyhydroxyl nonionic compounds;
   c. nonionic surfactant formed by the reaction of an ethoxylated Schiff base with a methyl alkyl ketone;
   d. i-alkyl-polyethylene-polyamines reacted with maleric acid semiamide—nonionic compound with antibiocide properties;
   e. nonionic surfactant derived from polyethoxylated alcohols+vinyl-alkyl ethers;
   f. biodegradable glycidol surfactant (nonionic), e.g., alcohol+glycidol (with catalyst) producing nonionic surfactant (biodegradable);
   g. multiblock polyacetal copolymer surfactants, e.g., poly-propylene oxide or poly-ethylene oxide+dialkyl ether;

h. urea-ethoxamer nonionic inclusion compounds, e.g., urea+polyethoxylated long chain alcohols; and i. polyglycol ethers+polyglycol$_{6000}$+epichlorohydrine derived nonionic surfacts; etc.

Exemplary Applications

Some exemplary applications of the principles and compositions of a first aspect of the present invention are listed below:

1. Cleaning crude oil and petrochemical storage tanks;
2. Injection into crude oil pipelines to prevent wax or "slop" separation;
3. Add to crude oil in oceangoing vessels to prevent wax or "slop" separation;
4. As a dispersant in base lube oil stocks to lower the cloud point, namely as a dehazing compound;
5. As a wax liquefier and dispersant in base lube oil stocks to lower the pour point;
6. As a dispersant in gasoil to lower the cloud point, namely as a dehazing compound;
7. As a wax liquefier and dispersant in gasoil to lower the pour point;
8. As a demulsifier for crude oil in pipelines and storage tanks;
9. As a wax liquefier in downhole operations in the production of crude oil;
10. As a dispersant and degreaser in crude oil storage tanks;
11. As a dispersant and degreaser in petrochemical storage tanks;
12. As an additive in engine lubricating oil for the purpose of dispersing lubricating oil sludge;
13. As a method of measuring the true value of crude oil by demulsifying the water in the crude oil; this will allow for a more accurate measurement of the actual amount of crude oil being purchased;
14. As a dispersant and wax liquefier in hydrocarbon liquids derived from natural gas processing, i.e., condensates;
15. As a dispersant for napthenic acids in fuel oils;
16. As a dispersant for sludge in processing units such as catalytic crackers;
17. As a dispersant for waste wax residue derived from polyethylene plants for the purpose of dispersing the wax into fuel oil;
18. As a dispersant for wax in cutting and cooling fluids used in machining operations;
19. As a dispersant for wax in heavy fuel oils such as, for example, "Bunker C" and Fuel Oil No. 6 (heating oil);
20. As a wax liquefier and degreaser in heat exchangers in various petroleum refining process units (e.g., furfural lube oil extraction plants);
21. As a dispersing agent for coke and carbon fines into hydrocarbon liquids and/or water;
22. As a dispersant for cleaning machine parts;
23. As a liquefier and dispersant for wax into hydrocarbon liquids derived from Fischer-Tropsch synthesis;
24. As a dispersant for wax in edible oils;
25. As a dispersant for wax in organic solvents;
26. As a dispersant for asphalt in various hydrocarbon solvents;
27. As a dispersant in cutting oil emulsions;
28. As a dispersant for naturally-occurring waxes in various hydrocarbon media and water;
29. As a liquefier and dispersant for wax used as a protective coating;
30. As a dispersant and liquefier for wax for oil recycling processes;
31. As a dispersant for highly-paraffinic organic compounds into various organic solvents;
32. As a liquefier and dispersant additive in gasoline and fuel oil;
33. As a degreaser for removing asphalt from concrete surfaces;
34. As a neutral metal degreaser for metal parts in dip tanks;
35. As a liquefier for wax derived from pipeline pigging operations;
36. As a dispersant in oil for extreme pressure additives (E.P.A.);
37. As a dispersant in oil for anti-wear additives;
38. As a dispersant in lube oil to provide dispersion of products of degradation and combustion;
39. As a dispersant for fuel oil (e.g. "Bunker C"), diesel and gasoil;
40. As a dispersant for wax in solvent dewaxing processes;
41. As a dispersant for metals and sludge in petroleum waste products (e.g. oil/water separators);
42. As an additive for drilling muds to enhance their dispersion and surface active activity (contact) during drilling operations;
43. As an additive in petroleum production to enhance the flow of crude in secondary and tertiary production;
44. As a wax liquefier and dispersant in the production of
    a. floor coverings and polishes,
    b. adhesives,
    c. cosmetics,
    d. electrical insulation,
    e. leather finishes,
    f. matches,
    g. treated paper products,
    h. molding and coating processes,
    i. printing inks and varnishes,
    j. dental materials,
    k. explosives,
    l. crayons,
    m. textile finishes,
    n. candles,
    o. rubber antioxidants,
    p. corrosion inhibitors, etc.;
45. As a surface active agent and dispersion in descaling formulations;
46. As a surface active agent and dispersion in acid de-rusting formulations;
47. As a wax liquefier and dispersant in high-heat distillates (e.g. lignitic tar-lignite paraffins);
48. As a dispersant for asphalt and/or tar on surface coating such as, for example, roofing paper;
49. As a cleaning chemical in the cleaning of ship ballast tanks;
50. As a wax liquefier and dispersant in emulsions used in automobile and other vehicular care products (i.e., transportation cleaners);
51. As a biodegradable dispersant for agricultural fertilizers for trees and plants;

52. As a wax liquefier and dispersant in the manufacture of grease;

53. As a dispersant for inorganic compounds in water, such as tailings from mining;

54. As a dispersant and demulsifier for waste oil in oil production, exploration, transportation and refineries (A.P.I. separators); and 55. As a dispersant for wax in commercial car products to help in the self-rinsing applications; etc.

Exemplary Method for Recovering Slop Oil Tank Bottoms

At ambient temperature [e.g., 75° F. (degrees Fahrenheit), 24° C. (degrees Celsius)], slowly add 0.13 kg (0.286 lb.) of the exemplary composition to 10 kg (22 lb.) of slop oil under intense and vigorous mixing. Mix the two components throughly. After a homogeneous mixture has been achieved, immediately add 30 kg (66 lb.) of crude oil to the mixture of slop oil and the preferred composition. Continue mixing until a completely homogeneous mixture is obtained. This should take no longer than fifteen (15) minutes using the amounts specified.

During the mixing process water and sand will be observed separating from the mixture. The crude oil must be added with vigorous agitation even if water is separating during mixing. After a completely homogeneous mixture is obtained, cease agitation and allow the mixture to stand for three to four (3–4) hours.

After allowing the mixture to stand for three to four (3–4) hours, a separation layer of water and sand will be observed on the bottom of the tank; the mixture of crude oil and the composition will remain on top. The viscosity of the new hydrocarbon fraction will be low and the layer will be completely homogenous; there should be no lumps or pieces of paraffin floating in the hydrocarbon fraction.

Separate the water/sand layer from the mixture by, for example, pumping. The crude oil mixture may then be transferred to a storage tank and on to further processing.

Tests of Initial Composition

A number of tests have been run showing the efficacy of the present invention, with the first six (6) tests using the preferred composition or combination described above as preferred.

Test #1

The addition of a two (2%) percent dispersant to one (1) barrel of slop oil/tank bottoms under rapid mixing at 80 degrees C. (176° F.), followed by the addition of three (3) barrels of crude oil (at ambient temperature) resulted in a crude oil blend that was stable (no wax precipitates) for well over nine (9) months.

Test #2

A three (3%) percent dispersant was added to one (1) barrel of slop oil/tank bottoms at 40° C. (104° F.) under constant rapid mixing, followed by the addition of two (2) barrels of crude oil (at ambient temperature). The resulting product was a homogeneous and viscous blend of crude oil and slop oil/tank bottoms that showed no separation of the slop oil/tank bottoms component from the blend. The blend continues to remain homogeneous and viscous at ambient temperature for a period so far of well over nine (9) months.

Test #3

A small sample (50 grams) of heavy waxy slop oil was taken from an old storage tank; the slop oil had been in the tank for over ten (10) years. The slop oil was melted into a liquid mass at a temperature of approximately 80 degrees C. and stirred to obtain a homogeneous mixture. Two (2) ml of dispersant was added to the liquefied wax and the resulting blend was stirred for two (2) minutes at approximately 75° C.

After it was determined that the dispersant was thoroughly dispersed throughout the liquefied wax, 150 ml of crude oil tank bottoms (an extremely viscous liquid oil fraction) was added to the mixture and the resultant blend was stirred for an additional ten (10) minutes at 75° C. to obtain a homogeneous mixture. The mixture was removed from the heat and allowed to cool down to ambient temperature (25 to 30° C.). After reaching ambient temperature the mixture was separated into two halves and poured into glass bottles for observation. Each sample indicated two layers—a clear, oil-free water layer on the bottom that contained suspended solids (sand, etc.) and an upper layer of oil.

The samples were allowed to sit for a period of one hundred and twenty (120) days during which time it was observed that the oil layer remained completely homogeneous. There was no separation of any solid wax material. One of the samples was centrifuged at ambient temperature and three (3) layers were formed: a layer of sand and grit (3%); a layer of water (27%); and a layer of oil (70%). The oil layer remained homogeneous for a period of over seven (7) months; there was no separation of any solid paraffin. The oil layer remains homogeneous with no separation.

Test #4

To a reactor containing 10 kg of slop oil was added 30 kg of heavy Arabian crude oil containing 0.5 kg of dispersant. The mixture was agitated to a thoroughly homogeneous state for a period of one and a half (1½) hours. At the end of this period 38 kg of the crude+slop hydrocarbon was pumped out. The resulting mixture remained homogeneous for two (2) weeks; a layer of sand and water separated out of solution. The sand was pumped off and cleaned using the dispersant.

Test #5

In this test a steel machine gear heavily encrusted with hardened grease and dirt was immersed in a solution of dispersant and water. This gear had been stored outside, fully exposed to the elements, and had not been handled or moved for at least five (5) years. After being allowed to soak in the solution for a short time, the grease and dirt softened until only slight finger pressure would remove it. The solution was agitated for a few minutes and the grease and dirt completely dispersed into the solution. The gear was removed from the solution and the solution was allowed to stand. The grease remained suspended in the dispersant solution.

Test #6

A 50 gm sample of wax residue from a polyethylene production plant was heated to 120° C. To this heated sample was added 0.5 gms of the invention's exemplary composition of matter. The mixture was agitated until complete homogeneity was observed at 120° C. To the heated mixture of polyethylene waste wax plus compound was added 200 gms of fuel oil (#6 fuel). The fuel oil was added to the mixture at 120° C. This mixture was stirred until complete homogeneity was observed at 120° C. When a homogeneous mixture was observed, the heat was taken away and the mixture was allowed to cool down to room temperature. After the mixture reached room temperature, it was observed that no wax separated out of solution. After a period of two (2) months, still no separation of wax was observed.

Test #7

To check for its dehazing or cloud point lowering capabilities, to a sample of processed lube oil was added a modified mixture of the exemplary, usually preferred, composition of matter or product, namely, only the surface active agents (namely, polyalkylethoxylated alcohol plus nonylphenol plus a flourinated polyethoxylated alcohol) and a dispersing agent polymer derived from a copolymer of partially sulfonated, maleic anhydride and polystyrene, with the surface active agent and the dispersing agent being present in a ratio of two hundred to one (200:1), namely 99.5% to 0.5% by weight, was used.

At a concentration of five (500) parts per million (ppm) the cloud point of the lube oil was reduced from +15 degrees C. to +3 degrees C. This test was repeated at a concentration of two hundred and fifty (250) ppm and then of a thousand (1,000) ppm. The cloud point was reduced to +6° C. and +3° C., respectively. The results are summarized in the following table.

| Concentration (ppm) | Reduced Cloud Point (degrees C.) from +15° C. |
|---|---|
| 250 | 6 |
| 500 | 3 |
| 1,000 | 3 |

Test #8

A test was performed, whereby coke from a delayed coker unit at a refinery was treated with the preferred composition of matter in a heated water mix, and the following results were obtained:

Water plus a half (0.5%) percent by weight of the invention's preferred composition of matter were mixed together and heated to about 200° F., with the coke in chunk form dropped into the stirred hot water and composition of matter mix. All of the coke treated was found to be completely dispersed in the heated mixture. Such dispersal would not have occurred without the presence of the added composition of matter of the invention.

The coke used in the test was from a stub tower and the blow-down tower from the delayed coker unit. The test showed that, with the coke being in the dispersed state, the coke could be easily removed from the unit as a dispersion in water and thus easily removed from the site.

Exemplary Enhanced Chemical Composition or Mixture (2$^{nd}$ Aspect)

In a second aspect of the invention, the following three (3) ingredients are included with "505-SD" (defined above):
1. The addition of a plasticizer or leveling agent (a/k/a a de-airing agent) increases the conversion rate of crystalline wax (platelets, needles, microcrystalline and/or macrocrystalline) to the amphorous form of wax (mal). The typical plasticizers are phosphate esters, phthalate esters, adipate esters and/or benzoate esters.

The preferred esters are the following:
a. tributoxyethylphosphate (KP-140);
b. tributyl phosphate;
c. tri-isobutyl phosphate;
d. tris (2-ethylhexy) phosphate Flexol TOF (Reomol TOF);
e. tricresyl phosphate;
f. dioctylpthalate;
g. diethyl pthalate;
h. di-(2-ethylhexyl) adipate-Flexol-A-26;
i. di-(n-hexyl) phthalate-Flexol DHD;
j. di-(2-ethylhexyl) phthalate-Flexol DOD;
k. diethyleneglycol, dibenzoate-Flexol 2 GB;
l. triglycol di (2-ethylbutyrate)-Flexo 3 GH;
m. polyethylene, 200 di (2-ethyl hexoate)-Flexol 4GD;
n. triglycol di (2-ethylhexoate)-Flexol 3GO; and
o. di (2-ethylhexyl) tetratrihydrophtalate-Flexol-8HP.

When a plasticizer from the group listed above is mixed in a range of concentration by weight of about five-hundredths (0.05 to 65%) about sixty-five percent with the "505-SD" formulation, the liquefaction rate of wax is increased markedly.

2. When a hydrotrope-demulsifier and a chelating agent are mixed with the afore described "505-SD" formulation mixture, the solubility of the wax increases substantially in a hydrocarbon solvent, with a separation of water and solids from a slop oil wax emulsion to form a three-phase separation (oil-wax, water and solids).

The recommended hydrotrope-demulsifiers are as follows:
a. Sodium Xylene Sulfonate;
b. Sodium Dodecyl Sulfonate;
c. Sodium Cumene Sulfonate;
d. Ammonium Cumene Sulfonate;
e. Sodium Napthalene Sulfonate; and
f. Sodium Napthenic Acid Sulfonate;

3. The preferred chelating agents are:
a. Ethylenediamine tetraacetic acid (Versene);
b. Sodium salt of Ethylenediamine tetraacetic acid;
c. Nitrilotriacetic acid (NTA); and
d. polymeric chelating agents derived from copolymers of acrylic and maleic acids.

When a chelating agent from the group of those listed above is added in a range of about two to about twenty-five (2 to 25%) percent and one of the hydrotrope-demulsifier in the group listed above is added in the range of about five to about fifty (5 to 50%) percent to a mixture comprising a plasticizer from the group listed above in a range of about five hundredths (0.05 to 65%) to about sixty-five percent to the formulation afore-described as "505-SD." The resulting mixture reaching one hundred (100%) percent of the above described components results in a product that will allow crystalline wax or low A.P.I. gravity asphalt residue emulsion to become solubleized (dispersed) in a crude oil diluent with a complete separation of hydrocarbons, water and solids. In other words, a three-phase separation.

An exemplary, preferred combination of the ingredients for "505-SD" and the additional three ingredients of the foregoing, the combination of which is referenced herein as "505-SD-M," includes the following.

To a four (4) liter (4,000 ml) beaker equipped with a stirring mechanism is added at room temperature the following chemicals in the order listed below:

Part A:
1. Sodium Xylene Sulfonate (40% active)=1,200 ml (1,420 gms),
2. Dissolvine 39 (E.D.T.A. Sodium Salt (39% active)=120 ml (155 gms),
3. Butyl Cellosolve=250 ml (225 gms),
4. Mixture of Nonionic Surfactants=55 ml (53.4 gms), (Alcohol Exthoxylate 9.5)

5. Mixture of Nonionic Surfactants=80 ml (84 gms), (Nonyhexthoxylated Phenols, 4-EO, 6-EO and 12-EO),
6. KP-140 (tributoxyethyl phosphate)=51.0 ml (52.0 grms),
7. "Zonyl FSN" (Nonionic fluorosurfactant; a fluorinated polyethoxylated alcohol, 47% active)=6.0 ml (6.1 gms),
8. Butyl Cellosolve=1,053 ml (950 gms), and
9. Pine Oil=528 ml (502 gms).

To this mixture is slowly added a pre-blend of the following ingredients.

Part B:
1. Vegetable Oil=120 ml (108 gms),
2. Copolymer of maleic acid+polystyrene-sulfonated (25% active)=15 ml (17.9 gms), and
3. Mixture of o-cresol plus p-cresol=2.0 ml (1.9 gms).

The final mixture is prepared by adding slowly Part B to Part A at room temperature. Part B is an emulsion that clears up when added to Part A. The total volume is 3,450 ml.

The percentages by volume of each component to the final composition of Part A+Part B are

| Part A + Part B: | |
| --- | --- |
| Sodium Xylene Sulfonate (40% active) = | 35.00% |
| E.D.T.A. (39%) = | 3.50% |
| Butyl Cellosolve = | 7.00% |
| Nonionic Surfactants = | 4.00% |
| KP-140 = | 1.50% |
| Zonyl FSN (Fluorosurfactant surface tension reducer) = | 0.10% |
| Butyl Cellosolve = | 31.00% |
| (total with above 38%) | |
| Pine Oil = | 15.00% |
| Vegetable Oil = | 2.50% |
| Polymer Dispersant (Maleic-Polystyrene-Sulfonate) = | 0.50% |
| O/P Cresol = | 0.05% |
| TOTAL = | 100.15% |

EXAMPLES

Example #1 (Also See Summary Test Report Table Below)

Step 1: Two hundred (200) ml of oily emulsion sludge from T-101 (a tank containing wax emulsion rag stored by Salah-Sarawak Shell at the Shell E&P International Labuan Crude Oil Terminal in East Malaysia) was placed in a 400 ml glass beaker and heated to between 85–90° C. with mixing (a magnetic stirring bar was used as the method of mixing). To the two hundred (200) ml of sludge was added a half (0.5) ml of a formulation comprising a mixture of a hydrotrope-demulsifier (45% by wt sodium xylene sulfonate) a chelating agent (20% by wt. ethylenediamine tetra-acetic acid) a wax plasticizer (10% by wt. of tributoxyethyl phosphate) and 25% by wt. the formulation mixture "505-SD" (0.25% by volume) of sludge emulsion treated. The mixture of sludge emulsion and dispersant was heated and mixed continuously for a period of fifteen (15) minutes.

Step 2: Two hundred (200) ml of water was heated between about eighty-five to about ninety (85 to 90° C.) degrees Centigrade with mixing (a magnetic stirring hot plate was used as the mixing and heating method). When the temperatures of the water reached 85° C., two (2) ml of a mixture of 40% by wt. of water and 60% by wt., a weak organic acid (typical organic acids that can be used are citric acid, sulfamic acid, oxalic acid and/or glycollic acid; referenced herein as "A-1000;"1.00% by volume was added). The mixture was allowed to continue to mix for an additional ten (10) minutes.

Step 3: After both mixtures had been heated and stirred for a period often (10) minutes at 80 to 85° C., the beaker containing the two hundred (200) ml of water and "A-1000" was added to the beaker containing two hundred (200) ml of sludge emulsion and "505-SD." Immediately upon addition of the water "A-1000" solution to the sludge emulsion "505-SD" mixture, a separation occurred. The initial solution separated into three layers: a black upper layer of oil, a brownish middle layer of water, and a dark brown layer of solids dispersed in water.

Step 4: After the three layers had cooled to 75° C., fifty (50) ml of light crude oil (Shell L.C.O.T. export crude oil) was added to the mixture (400 ml of treated materials in a blend of light crude, water, and demulsified sludge plus chemicals was heated up to 80° C. and stirred for an additional 10 minutes.) The total blend was allowed to cool to room temperature. At room temperature, two distinct layers were formed: the upper layer of light crude plus recovered hydrocarbon and a lower layer of water plus solids dispersed in the water. As the temperature reached room temperature (25° C.), the solids began to settle out of the water.

The separation level of water and oil was as follows:

| | |
| --- | --- |
| Total oil recovered = | 215 ml |
| Less light crude added = | −50 ml |
| Net amount of oil recovered = | 165 ml |
| (Percentage of oil recovered = 82.5%) | |

In this example the ratio of light crude to recovered sludge crude is bout 0.3 to 1.0. In terms of barrels of light crude oil used to barrels of crude oil recovered, the ratio is 0.3 bbls of light crude to 1.0 bbls of recovered emulsion crude.

Analysis of the Crude Oil Blend

A sample of the final crude oil blend was sent to the terminal laboratory for testing. The two tests of interest were the BS&W (ASTM D4007-81) and pour point (ASTM D97-96a). The following results were obtained on the final crude oil blend:

| Result | "Acceptable limit" |
| --- | --- |
| BS&W = 0.00% | <2.00% |
| Pour point = 10° C.) | <15° C.) |

(The "acceptable limit" is the standard set by the terminal for export grade crude oil.)
The unprecedented achieving of a BS&W = 0.00% should be noted.

TANK 101 SLUDGE TREATMENT MONITORING REPORT
Report Reference: TK101/014/99

Job Request Ref:

Taken from: ESP Treatment Plant  Sample Description: K♦P.Crude Holdong TKS
Taken by: Jahari Junaidi      Indicator: EPT-DPC  Date/Time: Feb. 11, 1999 @ 1000 Hrs
Received By: Jahari Junaidi   Indicator: EPT-DPC  Date/Time: Feb. 11, 1999 @ 1000 Hrs

| TESTS | UNIT | RESULT | METHOD | ACCEPTABLE LIMIT |
|---|---|---|---|---|
| Treated Crude | | | | |
| Bottom Sediment and Water (B S & W %) | % Vol. | See Below | ASTM D 4007-81 | <2.00% |
| Density @15° C. | Kg/l | 0.8863 | ASTM D 1298-85 | |
| Pour Point | ° C. | 10.0 | ASTM D 97-98a | <15° C. |
| Effluent | | | | |
| Oil and Grease by Gravimdrie | mg/l | N/A | APHA 5520 B | <500 mg/l |
| pH | | N/A | | <pH5–pH8.5 |

Comments:
B.S. & W % 0.00
Emulsion % 1.40
OH % 98.60

Test results shall not be reproduced, except in full, without written approval from the Laboratory.
The above results relate only to the items tested.

Analysed: Johari Junaidi          Checked by:
Indicator: EPT-DPC                Indicator:
Date Feb. 11, 1999 ten 1140 Hrs   Date:

[Also see Article entitled "Cleaning Up the Slop: Part II" in *Hydrocarbon Engineering* (December 1999) and the preceding article "Cleaning Up the Slop" (July/August 1999), the contents of which are incorporated by reference.]

Additional Case Studies

A series of tests were performed at Calumet Lubricants Refinery in Princeton, La. The samples tested are from on site slop oil tanks with high concentrations of BS&W rag layers. The rag layers have a large concentration of water and paraffin. The solids content is relatively low.

Lab Experiment #1:

Two hundred (200) ml of Tank 5067 (Calumet Lubricants, Princeton, La.) was mixed with one (1) ml of "505-SD-M" and heated to 86° C. (187° F.). Separately six hundred (600) ml of tap water was mixed with five (5) ml of "A1000" and heated to 86° C. (187° F.). The two heated components were mixed and stirred for ten (10) minutes at 80° C. (176° F.). After stirring time was completed, a separation that would be usable in the plant was seen in ten (10) minutes. Over a longer period more cleaning of the water layer was apparent. Tank 5067 is 25% by volume water. A BS&W run and the volumes seen in the separation were identical.

Lab Experiment #2:

The initial samples for Tank 5058 (Calumet Lubricants, Princeton, La.) presented for testing showed no significant BS&W. Apparently other activities that have been carried out on this tank had split out the upper layers. The tank was bomb sampled every three (3) feet from the top of the fluid to the bottom of the tank. Samples from twenty-three (23) feet to the bottom of twenty-nine and a half (29'6") feet showed both a free water layer and a sludge layer below the water. The splitting efforts were applied to the material below the water layer.

Two hundred (200) ml of the twenty-six (26') foot layer (sludge) was mixed with one (1) ml of "505-SD-M" and heated to 65° C. (150° F.). Six hundred (600) ml of water was mixed with five (5) ml of "A1000" and heated to 65° C. (150° F.). The two pots were combined and one hundred (100) ml of Calumet diesel was added. The mixture was stirred for ten (10) minutes using a magnetic stir bar and maintained between 140° F. and 150° F. After stirring was completed, commercially usable separation had occurred in ten to fifteen (10–15) minutes. Longer separation times yield a cleaner separation.

Lab Experiment #3:

The remainder of all of the samples from twenty-three (23') feet to the bottom (Tank 5058) were mixed for a volume of twelve hundred (1200) ml. To this was added eighteen (1800) ml of water and fifteen (15) ml of "A1000." With stirring the mixture was heated to 65° C. (140° F.). When the mixture reached 65° C., six (6.0) ml of "505-SD-M" and one hundred and twenty (120) ml of Calument diesel were added. Stirring was continued at temperature for two (2) hours. When stirring was stopped, an oil/water separation in the four (4)-liter beaker occurred in less than ten (10) minutes. The sediment took longer to fall to the bottom.

Cost calculator:

(Gallons of sludge)×(0.005)×($30.00/gallon "505-SD-M")

For Water: (Gallons of water)×(0.015)×($15.00/gallon "A1000") For Diesel (Gallons of sludge)×(0.10)

Less than three volumes of water might be used, but the system appears to be considerably less stable. If recycled water is used, the 0.015 multiplier can be replaced with 0.009 for the "A-1000." The ten (10%) percent diesel is very necessary. Diesel is recovered when the oil layer is later processed through the crude unit.

It is noted that the formulations, compositions, and applications described herein generally and/or in detail were for exemplary purposes and are, of course, subject to many different variations. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A method of liquefying and dispersing crystalline wax in a petrochemical mixture, comprising the steps of:
   (a) chemically treating the crystalline wax in the petrochemical product to reduce the surface tension of the crystalline wax, converting it to an amorphous form of wax, and treating the crystalline wax in the petrochemical mixture with a surface active agent having a surface tension in water in the range of about 10 to about 48 dynes per cm, reducing the crystalline wax's surface tension, including with the surface active agent in a homogeneous mixture—
      about 15% to about 35% by weight butyl cellosolve; and
      about 5% to about 15% by weight of pine oil and a mixed catalyst solution made of saturated higher fatty acids, an alkyl phenol and an oil-water soluble copolymer of partially sulfonated, maleic anhydride and polystyrene with a molecular weight ranging from about 2,000 to about 2,000,000; and
   (b) dispersing the amorphous wax in a diluent.

2. The method of claim 1, wherein there is further included the step of:
   using a catalyst mixture in a range of about 0.5% to about 5% by weight.

3. A method of liquefying and dispersing crystalline wax in a petrochemical mixture, comprising the steps of:
   (a) chemically treating the crystalline wax in the petrochemical product to reduce the surface tension of the crystalline wax, converting it to an amorphous form of wax, and treating the crystalline wax in the petrochemical mixture with a surface active agent having a surface tension in water in the range of about 10 to about 48 dynes per cm, reducing the crystalline wax's surface tension, wherein the surface active agent is a nonionic surfactant, and wherein there is further included the step of:
      using, as a chemical composition mixture, a by-weight percent of the nonionic surface active agent of about 48%, with about 32% butyl cellosolve and about 17% pine oil acting as degreaser, about 2% of a mixture containing about 70% higher fatty acids, about 29% a copolymer of maelic anhydride and polystyrene and about 1% of catechol serving as a corrosion inhibitor; and
   (b) dispersing the amorphous wax in a diluent.

4. A chemical mixture, comprising:
   wax, originally in crystalline form, but converted to an amorphous form due to the presence of an additive including a nonionic surface active agent, a hydrotrope-demulsifier, a chelating agent and a wax plasticizer, wherein:
      said surface active agent represents about 48% by weight;
   and there is further included:
      about 32% butyl cellosolve and about 17% pine oil, about 2% of a mixture containing about 70% higher fatty acids, about 29% a copolymer of maelic anhydride and polystyrene and about 1% catechol.

5. A method of liquefying and dispersing crystalline wax in a petrochemical mixture, comprising the steps of:
   (a-i) chemically treating the crystalline wax with a surface active agent of a nonionic surfactant that is made up of up to about 99.9% by weight of a nonionic surfactant and down to about 0.1% by weight of a surface tension depressant, thereby converting the crystalline wax to an amorphous form of wax, using a nonionic polyethoxylate surfactant as the nonionic surfactant, wherein there is further included the step of:
   also adding with said nonionic polyethoxylated compound in a homogeneous mixture—
      about 15% to about 35% by weight butyl cellosolve,
      about 5% to about 15% by weight of pine oil and a mixed catalyst solution made of saturated higher fatty acids, an alkyl phenol and an oil-water soluble copolymer of partially sulfonated, maleic anhydride and polystyrene with a molecular weight ranging from about 2,000 to about 2,000,000;
   (a-ii) further, concurrently treating the dispersing crystalline wax in the petrochemical mixture with a hydrotrope-demulsifier, a chelating agent and a wax plasticizer; and
   (b) dispersing the resultant amorphous wax in a diluent.

* * * * *